(12) United States Patent
Rahimi et al.

(10) Patent No.: US 12,374,122 B2
(45) Date of Patent: Jul. 29, 2025

(54) OBJECT DETECTION VERIFICATION FOR VEHICLE PERCEPTION SYSTEM

(71) Applicant: GM GLOBAL TECHNOLOGY OPERATIONS LLC, Detroit, MI (US)

(72) Inventors: Amir M. Rahimi, Malibu, CA (US); Rodolfo V. Romero, Calabasas, CA (US); Dana Warmsley, Newbury Park, CA (US); Yao Hu, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 113 days.

(21) Appl. No.: 18/544,731

(22) Filed: Dec. 19, 2023

(65) Prior Publication Data

US 2025/0200980 A1   Jun. 19, 2025

(51) Int. Cl.
*G06V 20/56* (2022.01)
*G06V 10/56* (2022.01)
*G06V 20/40* (2022.01)
*G06V 20/70* (2022.01)

(52) U.S. Cl.
CPC ........... *G06V 20/56* (2022.01); *G06V 10/56* (2022.01); *G06V 20/41* (2022.01); *G06V 20/70* (2022.01); *G06V 2201/07* (2022.01)

(58) Field of Classification Search
CPC ........ G06V 20/56; G06V 20/70; G06V 20/41; G06T 7/11
See application file for complete search history.

(56) References Cited

U.S. PATENT DOCUMENTS

| | | | | |
|---|---|---|---|---|
| 10,297,070 | B1 * | 5/2019 | Zhu | G06V 30/19173 |
| 12,125,266 | B1 * | 10/2024 | Wang | G06V 10/20 |
| 2021/0056356 | A1 | 2/2021 | Gangadha | |
| 2021/0146952 | A1 * | 5/2021 | Vora | G06V 20/58 |
| 2023/0039379 | A1 * | 2/2023 | Schmidt | G06V 10/761 |
| 2023/0068103 | A1 * | 3/2023 | Zhou | G06F 16/583 |
| 2024/0089181 | A1 * | 3/2024 | Binet | G06F 11/202 |
| 2024/0220848 | A1 * | 7/2024 | Mahmud | G06N 20/00 |

(Continued)

FOREIGN PATENT DOCUMENTS

DE   102020131657 A1   6/2021

OTHER PUBLICATIONS

Zhang, Wang; Image caption generation based on object detection and knowledge enhancement; In: International Conference on Image, Signal Processing, and Pattern Recognition (ISPP 2023). SPIE, 2023. S. 127070W-1-127070W-7. doi: 10.1117/12.2680966.

(Continued)

*Primary Examiner* — Frank Johnson
(74) *Attorney, Agent, or Firm* — Quinn IP Law (57) ABSTRACT

A system for verifying accuracy of an object determination made with a perception system for an object detected within a surrounding area of a vehicle. The system may include a semantic extraction module configured for generating semantic information for the object, a semantic generation module configured for generating a plurality of semantic captions based on the semantic information, a consistency evaluation module configured for generating consistency scores for the semantic captions, and a diagnostics module configured for verifying accuracy of the object determination based on the consistency scores.

20 Claims, 3 Drawing Sheets

(56) References Cited

U.S. PATENT DOCUMENTS

2025/0148766 A1* 5/2025 Gopalkrishna ........ G06V 20/56
2025/0181711 A1* 6/2025 Monteuuis ............. G06V 20/56

OTHER PUBLICATIONS

Wang, Xiao, Bouferguene, Ai-Hussein, Li; Vision-based method for semantic information extraction in construction by integrating deep learning object detection and image captioning. In: Advanced Engineering Informatics, 2022, 53. Jg., S. 1-13. doi: 10.1016/j.aei.2022.101699.

* cited by examiner

OBJECT DETECTION VERIFICATION FOR VEHICLE PERCEPTION SYSTEM

INTRODUCTION

The present disclosure relates to verifying accuracy of object determinations made with a perception system, such as but not necessarily limited to verifying accuracy of object determinations made with a perception system for objects detected within a surrounding area of a vehicle.

A perception system may be used for detecting objects within a surrounding area of the vehicle for purposes of assisting in navigation or otherwise influencing operations of the vehicle. The perception system may be utilized to detect a wide range of objects, such as other vehicles, pedestrians, road signs, traffic signs, buildings, landmarks, and the like. The perception system may generate an object determination to describe movement, location, size, shape, color, and/or other characteristics detected for the objects. The object determination may be utilized with other systems onboard the vehicle to facilitate a variety of dependent processes, which may have differing degrees of influence over operation of the vehicle. Due to the complexity and variability associated with perception systems making object determinations, it may be desirable to verify an accuracy of the object determinations to avoid inaccurate object determinations being used to undesirably influence operation of the vehicle.

SUMMARY

One aspect of the present disclosure relates to an architecture operable for verifying accuracy of object determinations made with a perception system, such as but not necessarily limited to verifying accuracy of object determinations made with a perception system of the type configured for detecting objects within a surrounding area of a vehicle. The contemplated accuracy verification may be based on a language-image model and include extracting visual features from a scene, such as components, scene graphs, etc., generating textual language sentences according to visual and non-visual information to provide a descriptions of the objects in the scene based on different logics, and generating a consistency score for use in verifying accuracy of an attendant object determination based on the image and the generated description of the objects.

One aspect of the present disclosure relates to a system for verifying accuracy of an object determination made with a perception system based on detecting an object within a surrounding area of a vehicle. The system may include a semantic extraction module configured for generating semantic information for the object, a semantic generation module configured for generating a plurality of semantic captions based on the semantic information, a consistency evaluation module configured for generating consistency scores for the semantic captions, and a diagnostics module configured for verifying accuracy of the object determination based on the consistency scores.

The semantic extraction module may be configured for generating the semantic information based on data included within an image frame processed by the perception system to make the object determination.

The semantic generation module may be configured for generating the semantic captions to explicitly include textual language describing a scene associated with the object.

The consistency evaluation module may include a language-image model operable for generating the consistency scores.

The consistency evaluation module may be configured for verifying accuracy of the object determination based on a relative comparison of the consistency scores.

The perception system may be operable for detecting objects across a plurality of object types, the semantic generation module is configured for generating at least one of the semantic captions for each of the object types, and the diagnostic module is configured for verifying accuracy of the object determination when the object determination matches with the semantic caption associated with the consistency score having a greatest relative ranking within the relative comparison.

The perception system may be operable for detecting objects across a plurality of object types, the semantic generation module is configured for generating at least one of the semantic captions for each of the object types, optionally with each of the semantic captions includes relative size and location for the object type associated therewith. The diagnostic module may be configured for verifying accuracy of the object determination when the object determination matches with the semantic caption associated with the consistency score having a greatest relative ranking within the relative comparison.

The semantic generation module may be configured for generating an object caption as one of the semantic captions, optionally with the object caption being based an object identifier selected by the perception system for the object. The semantic generation module may be configured for determining a plurality of component identifiers for the object from a set of component identifiers listed in a mapping module for the object identifier.

The semantic generation module may be configured for generating a plurality of component captions as part of the semantic captions, optionally with each of the component captions identifies a different one or a combination of more than one of the component identifiers. The diagnostics module may be configured for verifying accuracy of the object determination when the consistency score of the object caption is less than at least one of the consistency scores of the component captions.

The semantic generation module may be configured for generating a plurality of component captions as part of the semantic captions, optionally with each of the component captions identifying a different one or a combination of more than one of the component identifiers and includes relative size and location of a component associated with the component identifiers thereof. The diagnostics module may be configured for verifying accuracy of the object determination when the consistency score of the object caption is less than at least one of the consistency scores of the component captions.

The semantic generation module may be configured for generating a plurality of detailed captions as part of the semantic captions, optionally with each of the detailed captions identifying detailed information of the object including at least one associated characteristic for textual, material and color. The diagnostics module may be configured for verifying accuracy of the object determination when the consistency score of the object caption is less than at least one of the consistency scores of the detailed captions.

The semantic generation module may be configured for generating a plurality of common sense captions as part of the semantic captions, optionally with each of the common sense captions identifying common sense information of the object including at least one associated characteristics for usage, scene, and relationship with neighboring objects. The diagnostics module may be configured for verifying accuracy of the object determination when the consistency score of the object caption is less than at least one of the consistency scores of the common sense captions.

The semantic generation module may be configured for generating a plurality of combined captions as part of the semantic captions, optionally with each of the combined captions combining at least one of a plurality of component captions, detailed captions, and common sense captions. The diagnostics module may be configured for verifying accuracy of the object determination when the consistency score of the object caption is less than at least one of the consistency scores of the combined captions.

The diagnostics module may be configured for determining the object to be either verified or unverified depending on the consistency scores.

The system may include a mitigation module configured for instructing a trajectory planner system onboard the vehicle when the object is determined to be unverified.

One aspect of the present disclosure relates to a method for verifying accuracy of an object determination made with a perception system based on detecting an object within a surrounding area of a vehicle. The method may include generating semantic information for the object based on data included within an image frame processed by the perception system to make the object determination, generating a plurality of semantic captions based on the semantic information including textual language describing a scene associated with the object, generating consistency scores for the semantic captions, and determining the object determination to be one of verified or unverified based on the consistency scores.

The method may include generating an object caption as one of the semantic captions, wherein the object caption is based an object identifier selected by the perception system for the object, determining a plurality of component identifiers for the object from a set of component identifiers listed in a mapping module for the object identifier, generating a plurality of component captions as part of the semantic captions, optionally with each of the component captions identifying a different one or a combination of more than one of the component identifiers, and verifying accuracy of the object determination when the consistency score of the object caption is less than at least one of the consistency scores of the component captions.

One aspect of the present disclosure relates to a vehicle including a propulsion system configured for propelling the vehicle, a perception system configured for detecting an object within a surrounding area of the vehicle, a trajectory planner system configured for directing operation of the propulsion system based on an object determination made by the perception controller for the object, and a verification system. The verification system may be configured for generating semantic information for the object based on data included within an image frame processed by the perception system to make the object determination, generating a plurality of semantic captions based on the semantic information including textual language describing a scene associated with the object, generating consistency scores for the semantic captions, and determining the object determination to be one of verified or unverified based on the consistency scores The trajectory planner system may be configured to direct operation of the propulsion system based on a verification notification provided from the verification system indicating whether the object determination is verified or unverified.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure may be disclosed herein; however, it may be understood that the disclosed embodiments may be merely exemplary of the disclosure that may be embodied in various and alternative forms. The figures may not be necessarily to scale; some features may be exaggerated or minimized to show details of particular components. Therefore, specific structural and functional details disclosed herein may need not to be interpreted as limiting, but merely as a representative basis for teaching one skilled in the art to variously employ the present disclosure.

Figure 1:
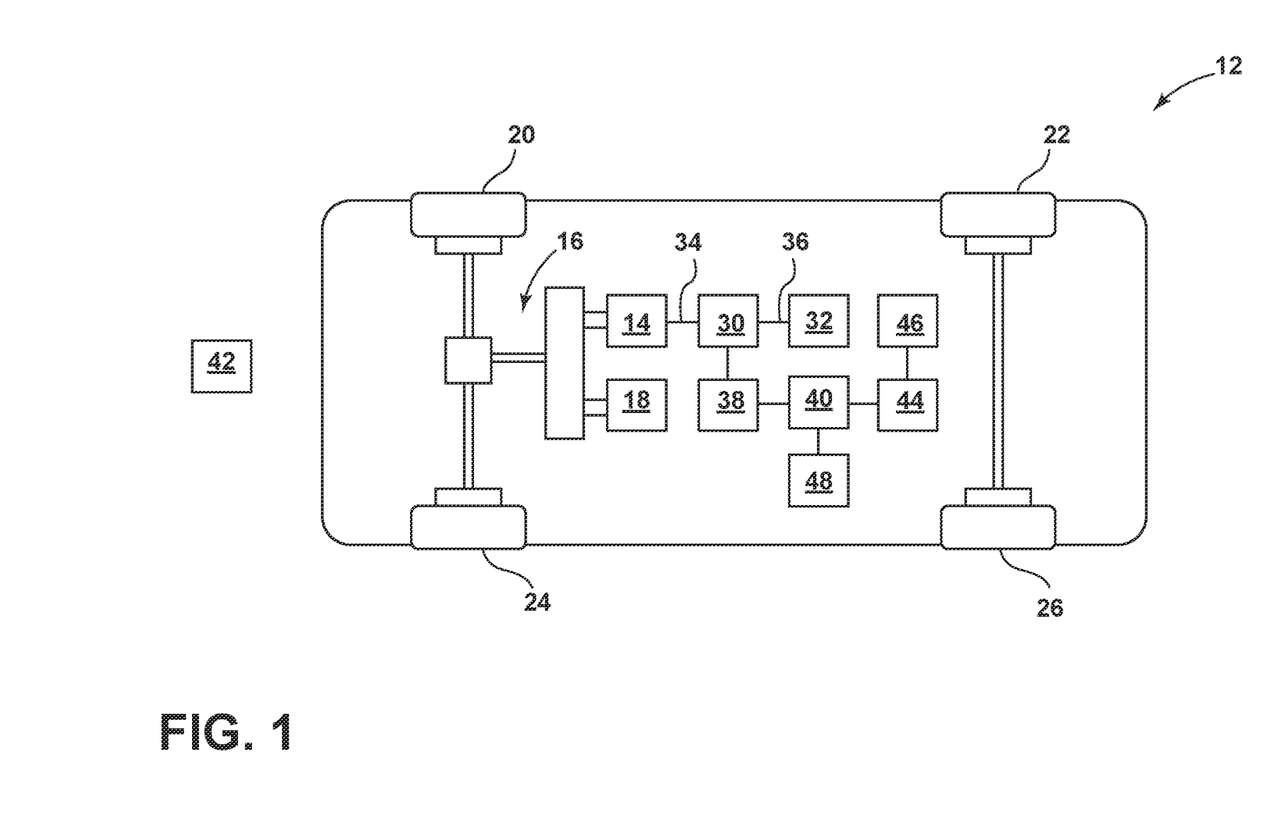
FIG. 1 illustrates a vehicle in accordance with one non-limiting aspect of the present disclosure.

FIG. 1 illustrates a vehicle 12 in accordance with one non-limiting aspect of the present disclosure. The vehicle 12, which may be interchangeable referred to as an electric or hybrid vehicle 12, may include a traction motor 14 operable for converting electrical power to mechanical power for purposes of performing work, such as for mechanically powering a drivetrain 16 to propel the vehicle. The vehicle 12 is illustrated as a hybrid type due to the powertrain 16 optionally including an internal combustion engine (ICE) 18 for generating mechanical power. The vehicle 12 may alternatively omit the electric motor 14 and instead be solely propelled with the ICE 18. The powertrain 16 may include componentry to facilitate conveying rotative force from the traction motor 14 and/or the ICE 18 to one or more of the wheels 20, 22, 24, 26. The vehicle 12 may include a rechargeable energy storage system (RESS) 30 configured to store and supply electrical power for the traction motor 12 and/or other components, systems, etc. onboard the vehicle 12, such as via a first bus 34 and a second bus 36. The vehicle 12 may include a vehicle controller 38 to facilitate monitoring, controlling, measuring, and otherwise directing operation, performance, etc. onboard the vehicle 12, which may include performing measurements, taking readings, or otherwise collecting data to facilitate diagnosing constraining events and correspondingly managing the RESS 30 to mitigate the influence thereof while maintaining operation of the RESS 30 within defined operating boundaries.

The vehicle 12 may include a perception system 40 configured for detecting objects 42 within a surrounding area or vicinity of the vehicle 12 based on information collected with a sensor system 44. While a singular object 42 is shown, the perception system 40 may be configured for simultaneously detecting a plurality of the objects 42, including detecting objects 42 in other areas relative to the vehicle 12 or otherwise having differing spatial relations to the vehicle 12 than the illustrated object 42. The perception system 40 may be operable with a trajectory planner 46 and/or additional systems (not shown) onboard and/or off-board for the vehicle 12 for purposes of assisting in navigation or otherwise influencing operations of the vehicle 12. The perception system 40 may be utilized to detect a wide range of objects 42, such as other vehicles, pedestrians, road signs, traffic signs, buildings, landmarks, and the like. The perception system 40 may generate an object determination to describe movement, location, size, shape, color, and/or other characteristics detected for the objects 42. The object determination may be utilized with the trajectory planner 46 or other systems associated with the vehicle 12 to facilitate a variety of dependent processes, which may have differing degrees of influence over operation of the vehicle 12. Due to the complexity and variability associated with object determinations made by the perception system 40, the vehicle 12 may include a verification system 48 operable for verifying an accuracy of the object determinations to avoid inaccurate object determinations being used to undesirably influence operation of the vehicle 12. In other embodiments, the verification system 48 may be implemented in the back-office and perform the verification task offline. In such use cases, the output of the verification system 48 may be used to support analysis and development of perception module 40.

Figure 2:
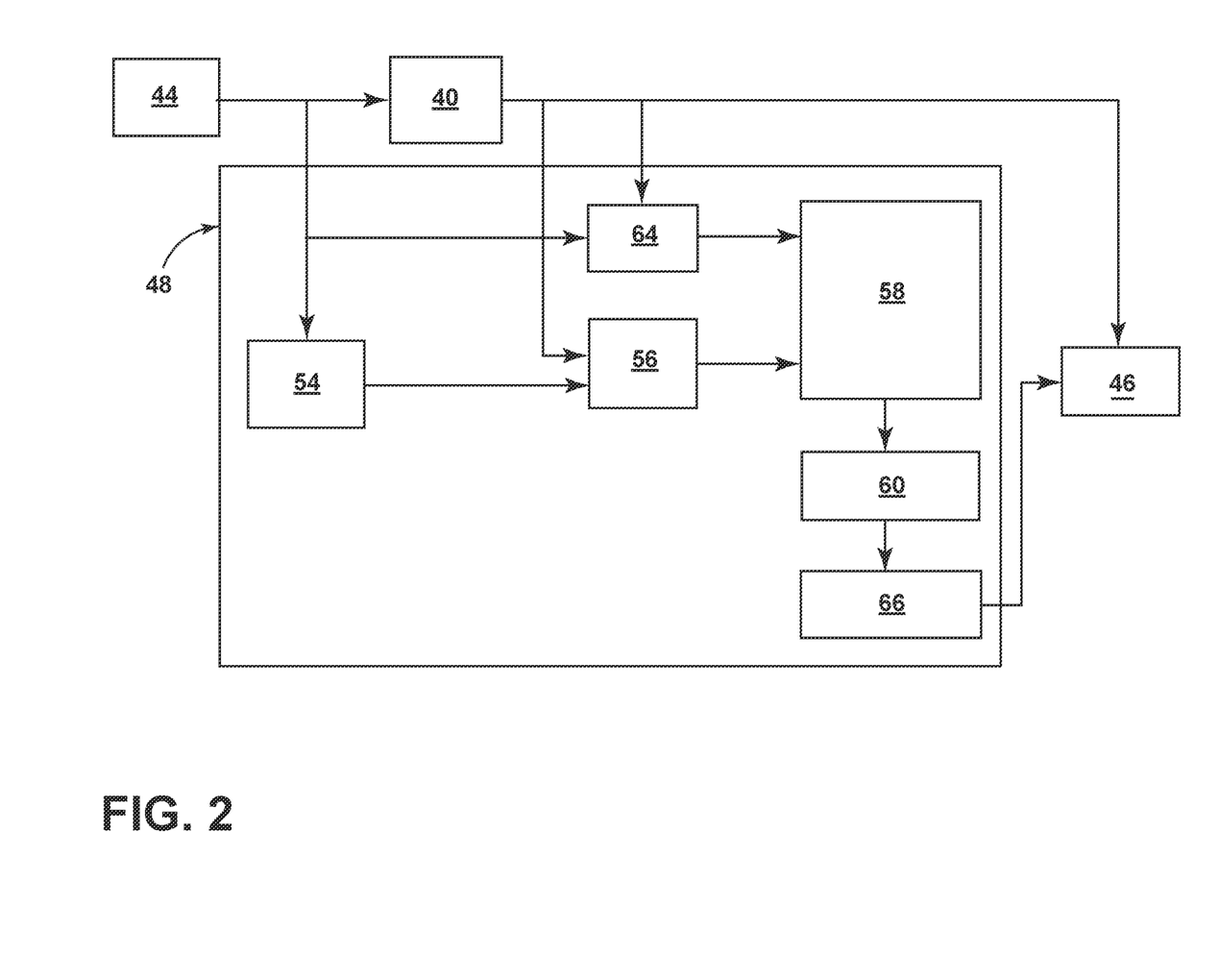
FIG. 2 illustrates a schematic diagram of a verification system in accordance with one non-limiting aspect of the present disclosure.

FIG. 2 illustrates a schematic diagram of the verification system 48 in accordance with one non-limiting aspect of the present disclosure. The verification system 48 is shown for exemplary purposes as being operable with the perception system 40, the sensor system 44, and the trajectory planner 46, however, the present disclosure fully contemplates the verification system 48 being operable with a wide variety of other devices and systems. The verification system 48 is also described with respect to the perception system 40 being included onboard the vehicle 12 for exemplary purposes as the present disclosure fully contemplates the verification system 48 being operable in other environments, including non-vehicle based environments where the perception system 40 may be included or implemented as part of a robot, a machine, an autonomous operating device/equipment, etc. The sensor system 44 may include various componentry for facilitating detection of the object 42, including various sensors configured for sensing the surroundings of the vehicle. The sensors may, for example, include cameras and other sensors (e.g., radar, LIDAR, sonar, etc.) situated at various locations within and outside the vehicle. The system may be configured for generating or capturing images/frames, metrics, information, and other sensor data for use with the perception system 40.

The perception system 40 may be implemented using a deep neural network (DNN) or other suitable infrastructure such that, for a given image derived from the sensor data, the perception system 40 may output object information for each object 42 detected in the image. The object information, for example, may be included in a perception table similar to the table shown below.

| Object ID | Class | Bounding Box | Probability Score |
|---|---|---|---|
| 1 | car | $x_{1,1}, y_{1,1}, x_{2,1}, y_{2,1}$ | 0.846 |
| 2 | boat | $x_{1,2}, y_{1,2}, x_{2,2}, y_{2,2}$ | 0.815 |
| 3 | car | $x_{1,3}, y_{1,3}, x_{2,3}, y_{2,3}$ | 0.975 |

The perception system 40 may provide a representation of the object 42 in a bounded box with positional coordinates of the object indicating the position of the object relative to the vehicle. The perception system 40 may further classify the object 42 (e.g., provide an indication about the type or class of the object, whether the object is a vehicle, a traffic sign, a landmark, a pedestrian, etc.). The perception system 40 may then assign a probability to a detected object 42. The probability may be used to indicate a level of confidence with which the perception system 40 (e.g., the DNN) detects the object. For example, if a car is a little vague in the image, but is still captured by the neural network, it may have a low probability. Conversely, if a car is clear in the image, it may have a high probability. For each object detected in a frame, corresponding object information may be generated by the perception system 40, which may include an object ID (e.g., a number assigned to the object in the frame), object class (e.g., car, truck, boat, etc.), bounding box data, and a probability score. Accordingly, the perception system 40 may output a plurality of detection results as shown in the table above, where the table includes for each identified object, an ID, a class, bounding box coordinates, and a probability score.

The perception table and/or other information generated with the perception system 40 based on the scene data may be compiled in the described manner and/or according to other processes to facilitate generating an object determination for one or more objects identified in the corresponding scene. The perception system 40 may provide the object determination to the trajectory planner system 46 for use in facilitating operation of the vehicle. The trajectory planner system 46, for example, may include guidance technology or other systems whereby the vehicle may be controlled to identified in the object determination, which may include autonomously or semi-autonomously controlling the vehicle to take action. One aspect of the present disclosure relates to the verification system 48 being operable with the trajectory planner system 46 system to facilitate verifying accuracy of the object determinations made by the perception system 40. The verification system 48 may be configured for providing a verification to the trajectory planner system 46 system for purposes of indicating whether the object determination provided by the perception system 40 has been one of verified or unverified. The verification may be provided to the trajectory planner system 46 in concert with the object determination such that the trajectory planner system 46 may compare the verification with object determination to determine whether the object determination has been verified or unverified, and based thereon, facilitate related control the vehicle. Similar processes may be belatedly implemented for other systems on board and/or off or the vehicle, i.e., the object determination generated by the perception system 40 and the verification therefore generated by the verification system 48 may be similarly provided to those systems.

The verification system 48 may include a semantic extraction module 54 configured for generating semantic information for the object 42, a semantic generation module 56 configured for generating a plurality of semantic captions based on the semantic information, a consistency evaluation module 58 configured for generating consistency scores for the semantic captions, and a diagnostics module 60 configured for verifying accuracy of the object determination based on the consistency scores. The verification system 48 may optionally include a cropping module 64 configured for cropping individual objects from the images from the scene data for correlation with the related objected information generated with the perception system 40. The modules 54, 56, 58, 60, 64, 66 may be integrated and/or standalone software and/or hardware construct constructs, which may be operable according to a respective one or more processors executing an associated plurality of non-transitory instructions stored on one or more related computer-readable storage mediums. The modules 54, 56, 58, 60, 64, 66 are shown to be separate from each other for non-limiting purposes in order to functionally highlight different aspects of the present disclosure associated with processes for verifying accuracy of the object determinations made for the objects 42 detected by the perception system 40.

The semantic extraction module 54 may be configured for generating the semantic information based on data included within an image frame included as part of the scene data and processed by the perception system 40 to make the object determination. The semantic extraction module 54 may be based on a wide variety of computer vision and object detection constructs or the like, such as but not necessarily limited to UperNet, DETR (Detection Transformer), Scene Graph, etc. UperNet may include a network architecture designed for semantic segmentation of tasks in computer vision where the semantic segmentation may involve labeling each pixel in an image with a corresponding class label, allowing for a detailed understanding of the scene, which may include a semantic segmentation model architecture that unifies partitioning and prediction within a network for providing semantic segmentation benchmarks. DETR may include a specific object detection model that utilizes a transformer architecture to formulate object detection as a set prediction problem, which may be based on using a transformer encoder-decoder architecture for object detection. Scene Graph may include a representation of a scene in computer vision that captures the relationships between objects, such as tor provide a structured representation of the objects present in an image and their interactions or spatial relationships, representing a visual scene by modeling objects and their relationships, using nodes in the graph to represent objects, edges represent relationships between objects, and otherwise enable complex image understanding and multi-modal tasks.

The semantic generation module 56 may be configured for generating the semantic captions to explicitly include textual language describing a scene associated with an object. The semantic generation module 56 may be configured for generating an object caption as part of the semantic captions, optionally with the object caption being based an object identifier selected by the perception system 40 for the object, e.g., based on the object ID included in the perception table associated therewith. The semantic generation module 56 may be configured for determining a plurality of component identifiers for the object from a set of component identifiers listed in a mapping module for the object identifier. The semantic generation module 56, for example, may be configured for generating templates, such as but not necessarily limited to employing ConceptNet to generate the templates. ConceptNet may relate to a knowledge graph that connects words and phrases together through common sense relationships according to a large-scale, multilingual resource that represents general knowledge about the world. The information in ConceptNet may be manually curated and gathered from various sources, including books, websites, and other texts. ConceptNet may be able to organize knowledge into a network of nodes (concepts or terms) connected by edges (relationships), optionally with each edge representing a relationship between two concepts. ConceptNet can be used in natural language processing and artificial intelligence applications to provide a broader understanding of language and context. It helps systems to infer meanings and relationships between words beyond what is explicitly stated. The templates may refer to predefined structures or patterns that can be filled with specific content to generate text, which may permit the templates to act as a framework for constructing sentences or larger textual units. In other embodiments, the semantic generation module 56 may be implemented based on large language models or artificial intelligence (AI) systems. In other embodiments, the semantic generation module 56 may be implemented as a combination of above-mentioned methods.

The consistency evaluation module 58 may include a language-image model operable for generating the consistency scores. The consistency evaluation module 58 may be configured for verifying accuracy of the object determination based on a relative comparison of the consistency scores. The consistency evaluation module 58 may receive the outputs and other information generated by the cropping module and/or the semantic generation module to generate the consistency scores. Consistency evaluation module for example may be based on a CLIP (Contrastive Language-Image Pre-training) and/or ViT (Vision Transformer). In this manner, the consistency evaluation module may operate as an artificial intelligence model that is designed to understand and generate both textual and visual information, optionally with an aim to bridge the gap between natural language understanding and computer vision so that applications that can comprehend and generate content across both modalities. The diagnostics module 60 may be configured for determining the object to be either verified or unverified depending on the consistency scores. A mitigation module 66 may be configured for providing the corresponding verification to the trajectory planner system 46 system, i.e., notify the trajectory planner system 46 system whether the attendant object determination is verified or unverified. Optionally, such as to ameliorate processing demands on the trajectory planner system 46, the verification notification may be limited to the determination determined to be unverified. The trajectory planner system 46 may be correspondingly configured to accept the object determinations made by the perception system 40 in absence of receiving a verification notification indicating the object determination to be unverified.

Figure 3:
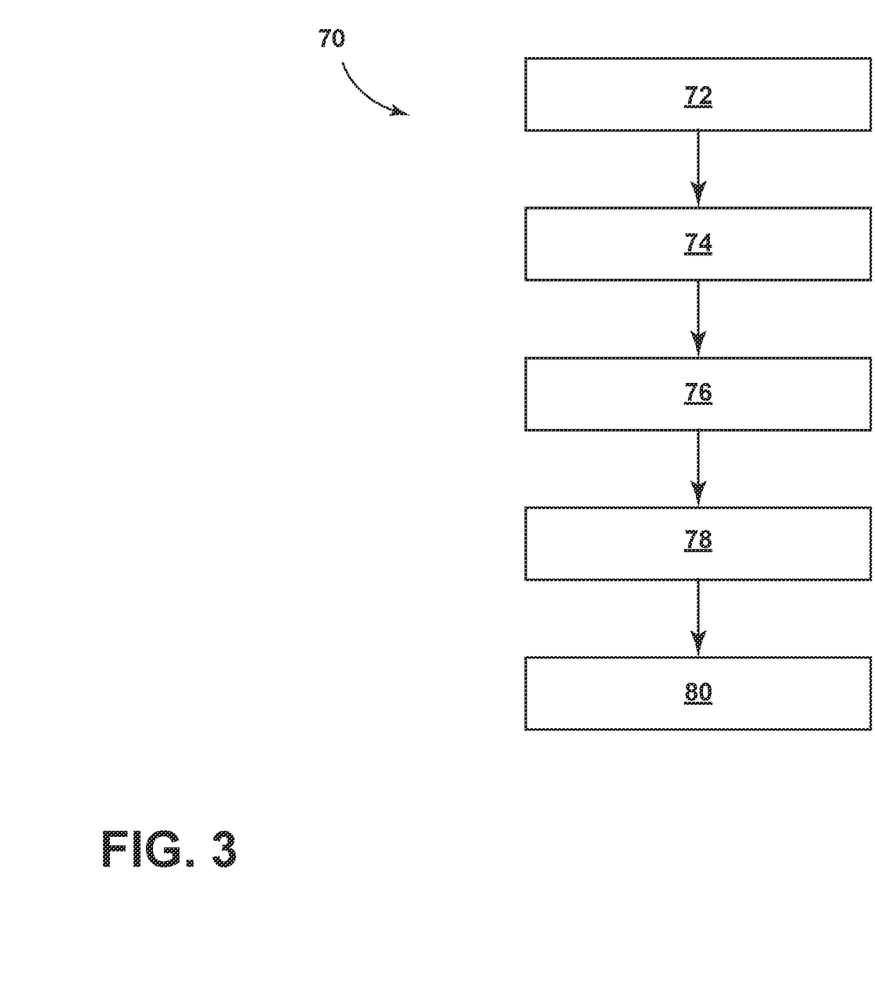
FIG. 3 illustrates a flowchart of a method for verifying accuracy of an object determination in accordance with one non-limiting aspect of the present disclosure.

FIG. 3 illustrates a flowchart 70 of a method for verifying accuracy of an object determination made with the perception system 40 in accordance with one non-limiting aspect of the present disclosure. Block 72 relates to a semantic extraction process whereby the semantic extraction module 54 may generate semantic information for the object based on data included within an image frame processed by the perception system 40 to make a corresponding object determination. Block 74 relates to a semantic description process whereby the semantic generation module 56 may generate a plurality of semantic captions based on the semantic information. Block 76 relates to an evaluation process whereby the consistency evaluation module 58 may generate consistency scores for the schematic captions. Block 78 relates to a diagnostics process whereby the diagnostics module 60 may verify accuracy of object determination based on the consistency scores generated as part of the evaluation process. Block 80 relates to a mitigation process whereby the mitigation module 66 may generate instructions for directing the trajectory planner system 46 system with respect to the verified and/or unverified object determinations. The present disclosure contemplates the described processes including a wide variety of options for generating the semantic captions and verifying accuracy of the attendant object determinations based on the consistency scores derived therefor. Accordingly, the description provided herein is not necessarily intended to limit the scope of contemplation of the present disclosure, however, corresponding examples are provided to demonstrate the beneficial capabilities of the dictation system to assist in limiting the likelihood of the trajectory planner system 46 system undesirably reliant upon inaccurate object determinations.

The semantic captions generated as part of the semantic description process, for example, may include textual language describing a scene associated with the object 42, optionally including at least one of the semantic captions for each of a plurality of object types associated with the object, which may also include relative size and location for the object type associated therewith. The semantic captions may include an object caption based on an object identifier selected by the perception system 40 for the object 42. The object identifier may be used by the semantic generation module 56 to determine a plurality of component identifiers for the object 42 from a set of component identifiers listed in a mapping module for the object identifier. In addition to or alternatively, the semantic description process may include generating a plurality of component captions as part of the semantic captions, optionally with each of the component captions identifying a different one or a combination of more than one of the component identifiers, which may also include relative size and location of a component associated with the component identifiers thereof. The semantic description process may include generating a plurality of detailed captions as part of the semantic captions, optionally with each of the detailed captions identifying detailed information of the object 42 including at least one associated characteristic for textual, material and color. The semantic description process may include a plurality of common sense captions as part of the semantic captions, optionally with each of the common sense captions identifying common sense information of the object 42, such as by including at least one associated characteristics for usage, scene, and relationship with neighboring objects. The semantic description process may include generating a plurality of combined captions as part of the semantic captions, wherein each of the combined captions combines at least one of a plurality of component captions, detailed captions, and common sense captions. The semantic description process may include generating a plurality of component captions as part of the semantic captions, optionally with each of the component captions identifying one permutation of a plurality of possible permutations of the component identifiers and one of the component captions is included for each of the possible permutations. The semantic description process may include generating each of the component captions identify one permutation of a plurality of possible permutations of the component identifiers and one of the component captions is included for each of the possible permutations, optionally with each permutation including relative size and location for a component associated with the component identifier thereof. By way of example, if the object is a car detected with the perception system 40, the semantic generation module 56 may generate the following captions: a picture of a car; a picture of a car on the road; a picture of a car with wheels; a picture of a car with headlights on the right; a picture of a car with windshield made of glass; a picture of a car with selected length and/or a combination of these descriptive captions.

The diagnostics process for determining the object determinations to be verified or unverified depending on the consistency scores generated for the semantic captions, for example, may include a variety of verification methodologies. One verification methodology may include verifying accuracy of the object determination when the consistency score of the object caption is less than each of the consistency scores of each of the component captions. Another verification methodology may include verifying accuracy of the object determination when the consistency score of the object caption is less than the consistency score of the component caption. Another verification methodology may include verifying accuracy of the object determination when the consistency score of the object caption is less than the consistency score of each of the component captions. when the consistency score of the object caption is less than at least one of the consistency scores of the component captions. Another verification methodology may include verifying accuracy of the object determination when the consistency score of the object caption is less than at least one of the consistency scores of the component captions. Another verification methodology may include verifying accuracy of the object determination when the consistency score of the object caption is less than at least one of the consistency scores of the detailed captions. Another verification methodology may include verifying accuracy of the object determination when the consistency score of the object caption is less than at least one of the consistency scores of the common sense captions. Another verification methodology may include verifying accuracy of the object determination when the consistency score of the object caption is less than at least one of the consistency scores of the combined captions.

The following example table may be representative of the semantic captions generated by the semantic generation module 56 and the related consistency scores analysis thereof generated by the consistency evaluation module 58 and the diagnostics module 60. The Template row may correspond with the semantic captions and the Analysis row may correspond with consistency score analysis used to adjudicate accuracy of the corresponding object determination.

| Ex. 1 | Template | Use perception system detected object to generate a caption "a picture of a DETR_Object". Generate captions for each possible Pascal object type "a picture of an Other_Pascal_ObjectType". |
|---|---|---|
| | Analysis | If the caption "a picture of a DETR_Object" returns a higher matching score compared to any other possible pascal object type, then verify accuracy. |

| | | -continued |
|---|---|---|
| Ex. 2 | Template | Use perception system detected object to generate a caption "a picture of a DETR_Object" and use associated parts to generate captions "a picture of a DETR_Object with DETR_Part". |
| | Analysis | If any caption with a part "a picture of a DETR_Object with DETR_Part" returns a higher score than "a picture of a DETR_Object", verify the DETR-detected object. A separate caption may be created for each detected part within the object bounding box. |
| Ex. 3 | Template | Use perception system detected object to generate a caption for "a picture of a DETR_Object" and use associated parts to generate captions "a picture of a DETR_Object with DETR_Parts" for all detected parts. |
| | Analysis | If the caption with parts "a picture of a DETR_Object with DETR_Parts" return higher score than "a picture of a DETR_Object", verify the detected object, optionally using a single caption with all detected parts within the DETR-detected object's bounding box. |
| Ex. 4 | Template | Use objects to generate a caption "a picture of a DETR_Object" and use associated parts to generate "a picture of a DETR_Object with DETR_Part" for all possible permutations of parts. |
| | Analysis | If any caption with a part "a picture of a DETR_Object with DETR_Part" returns higher score than "a picture of a DETR_Object", we verify the DETR-detected object. Evaluating over all possible permutations of detected parts in the caption. |
| Ex. 5 | Template | Use perception system detected object, size, and location to generate a caption "a picture of a DETR_Object" and use associated parts to generate captions "a picture of a DETR_Object of DETR_Object_Size with DETR_Part of [DETR_Part _Size] at DETR_Object_Location", for each detected part. |
| | Analysis | If any caption with a part "a picture of a DETR_Object of DETR_Object_Size with DETR_Part of of [DETR_Part_Size] at DETR_Object_Location" returns higher score than "a picture of a DETR_Object", verify the DETR-detected object, optionally including a separate caption being created for each detected part and locations within the object bounding box. |
| Ex. 6 | Template | Use perception system detected object, sizes and location to generate a caption "a picture of a DETR_Object" and use associated parts to generate one single caption with all parts with associated size and locations "a picture of a DETR_Object of DETR_Object_Size with DETR_Part of [DETR_Part_Size] at DETR_Object_Location". |
| | Analysis | If the caption with parts "a picture of a DETR_Object of DETR_Object_Size with DETR_Part of [DETR_Part_Size] at DETR_Object_Location" returns higher score than "a picture of a DETR_Object", we verify the detected object. Using a single caption with all detected parts within the DETR-detected object's bounding box. |
| Ex. 7 | Template | Generate a caption "a picture of a DETR_Object" and use associated parts, location and size to generate captions "a picture of a DETR_Object of DETR_Object_Size with DETR_Part of DETR_Part_Size at DETR_Object_Location and . . . " for all possible permutations of detected parts. |
| | Analysis | If any caption with a part "a picture of a DETR_Object of DETR_Object_Size with DETR_Part of DETR_Part _Size at DETR_Object_Location and . . . " returns higher score than "a picture of a DETR_Object", verify the DETR-detected object, optionally including evaluating over all possible permutations of detected parts in the caption. |
| Ex. 8 | Template | Use perception system detected object to generate a caption "a picture of a DETR_Object of DETR_Object_Size at DETR_Object_Location" and generate captions with location and size information for each possible Pascal object class "a picture of an Other_Pascal_Object_Type of DETR_Object_Size at DETR_Object_Location". |
| | Analysis | If the caption "a picture of a DETR_Object of DETR_Object_Size at DETR_Object_Location" returns a higher matching score from CLIP (Comparted to any other possible Pascal object type), verify the detection. |

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A system for verifying accuracy of an object determination made with a perception system, the perception system making the object determination based on detecting an object within a surrounding area of a vehicle, the system comprising:
a semantic extraction module configured for generating semantic information for the object;
a semantic generation module configured for generating a plurality of semantic captions based on the semantic information;
a consistency evaluation module configured for generating consistency scores for the semantic captions; and
a diagnostics module configured for verifying accuracy of the object determination based on the consistency scores.

2. The system according to claim 1, wherein:
the semantic extraction module is configured for generating the semantic information based on data included within an image frame processed by the perception system to make the object determination.

3. The system according to claim 2, wherein:
the semantic generation module is configured for generating the semantic captions to explicitly include textual language describing a scene associated with the object.

4. The system according to claim 3, wherein:
the consistency evaluation module includes a language-image model operable for generating the consistency scores.

5. The system according to claim 4, wherein:
the consistency evaluation module is configured for verifying accuracy of the object determination based on a relative comparison of the consistency scores.

6. The system according to claim 5, wherein:
the perception system is operable for detecting objects across a plurality of object types;
the semantic generation module is configured for generating at least one of the semantic captions for each of the object types; and
the diagnostic module is configured for verifying accuracy of the object determination when the object determination matches with the semantic caption associated with the consistency score having a greatest relative ranking within the relative comparison.

7. The system according to claim 5, wherein:
the perception system is operable for detecting objects across a plurality of object types;
the semantic generation module is configured for generating at least one of the semantic captions for each of the object types, wherein each of the semantic captions includes relative size and location for the object type associated therewith; and
the diagnostic module is configured for verifying accuracy of the object determination when the object determination matches with the semantic caption associated with the consistency score having a greatest relative ranking within the relative comparison.

8. The system according to claim 5, wherein:
the semantic generation module is configured for generating an object caption as one of the semantic captions, wherein the object caption is based an object identifier selected by the perception system for the object.

9. The system according to claim 8, wherein:
the semantic generation module is configured for determining a plurality of component identifiers for the object from a set of component identifiers listed in a mapping module for the object identifier.

10. The system according to claim 9, wherein:
the semantic generation module is configured for generating a plurality of component captions as part of the semantic captions, wherein each of the component captions identifies a different one or a combination of more than one of the component identifiers; and
the diagnostics module is configured for verifying accuracy of the object determination when the consistency score of the object caption is less than at least one of the consistency scores of the component captions.

11. The system according to claim 9, wherein:
the semantic generation module is configured for generating a plurality of component captions as part of the semantic captions, where each of the component captions identifies a different one or a combination of more than one of the component identifiers and includes relative size and location of a component associated with the component identifiers thereof; and
the diagnostics module is configured for verifying accuracy of the object determination when the consistency score of the object caption is less than at least one of the consistency scores of the component captions.

12. The system according to claim 9, wherein:
the semantic generation module is configured for generating a plurality of detailed captions as part of the semantic captions, wherein each of the detailed captions identifies detailed information of the object including at least one associated characteristics for textual, material and color; and
the diagnostics module is configured for verifying accuracy of the object determination when the consistency score of the object caption is less than at least one of the consistency scores of the detailed captions.

13. The system according to claim 9, wherein:
the semantic generation module is configured for generating a plurality of common sense captions as part of the semantic captions, wherein each of the common sense captions identifies common sense information of the object including at least one associated characteristics for usage, scene, and relationship with neighboring objects; and
the diagnostics module is configured for verifying accuracy of the object determination when the consistency score of the object caption is less than at least one of the consistency scores of the common sense captions.

14. The system according to claim 9, wherein:
the semantic generation module is configured for generating a plurality of combined captions as part of the semantic captions, wherein each of the combined captions combines at least one of a plurality of component captions, detailed captions, and common sense captions; and
the diagnostics module is configured for verifying accuracy of the object determination when the consistency score of the object caption is less than at least one of the consistency scores of the combined captions.

15. The system according to claim 1, wherein:
the diagnostics module is configured for determining the object to be either verified or unverified depending on the consistency scores.

16. The system according to claim 15, further comprising:
a mitigation module configured for instructing a trajectory planner system onboard the vehicle when the object is determined to be unverified.

17. A method for verifying accuracy of an object determination made with a perception system, the perception system making the object determination based on detecting an object within a surrounding area of a vehicle, the method comprising:
generating semantic information for the object based on data included within an image frame processed by the perception system to make the object determination;
generating a plurality of semantic captions based on the semantic information, the semantic captions including textual language describing a scene associated with the object;
generating consistency scores for the semantic captions; and
determining the object determination to be one of verified or unverified based on the consistency scores.

18. The method according to claim 17, further comprising:
generating an object caption as one of the semantic captions, wherein the object caption is based an object identifier selected by the perception system for the object;
determining a plurality of component identifiers for the object from a set of component identifiers listed in a mapping module for the object identifier;
generating a plurality of component captions as part of the semantic captions, wherein each of the component captions identifies a different one or a combination of more than one of the component identifiers; and
verifying accuracy of the object determination when the consistency score of the object caption is less than at least one of the consistency scores of the component captions.

19. A vehicle, comprising:
a propulsion system configured for propelling the vehicle;
a perception system configured for detecting an object within a surrounding area of the vehicle;
a trajectory planner system configured for directing operation of the propulsion system based on an object determination made by the perception system for the object; and
a verification system configured for:
generating semantic information for the object based on data included within an image frame processed by the perception system to make the object determination;
generating a plurality of semantic captions based on the semantic information, the semantic captions including textual language describing a scene associated with the object;
generating consistency scores for the semantic captions; and
determining the object determination to be one of verified or unverified based on the consistency scores.

20. The vehicle according to claim 19, wherein:
the trajectory planner system is configured to direct operation of the propulsion system based on a verification notification provided from the verification system indicating whether the object determination is verified or unverified.

* * * * *